April 23, 1963
F. R. YOST
3,086,544
CHECK VALVE
Filed Oct. 12, 1960
2 Sheets-Sheet 1
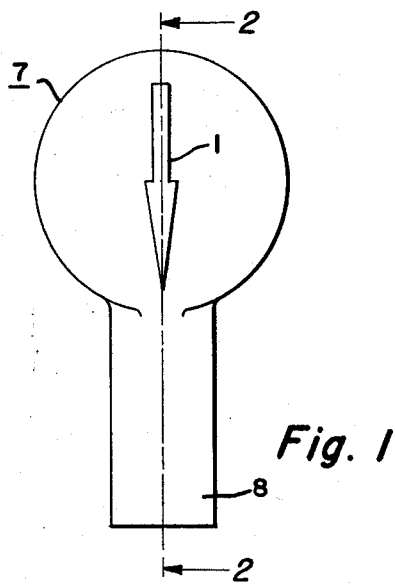
Fig. 1
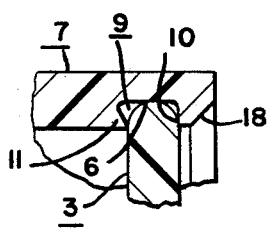
Fig. 3
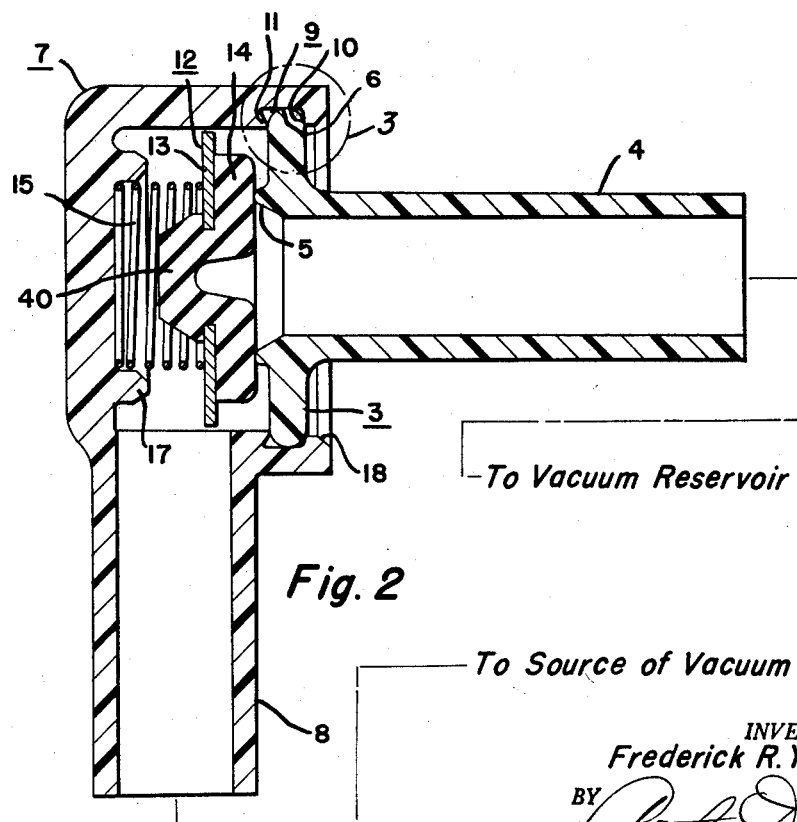
Fig. 2
INVENTOR.
Frederick R. Yost
BY
His Attorney April 23, 1963     F. R. YOST     3,086,544
CHECK VALVE Filed Oct. 12, 1960     2 Sheets-Sheet 2

INVENTOR.
Frederick R. Yost
BY
His Attorney

United States Patent Office 3,086,544
Patented Apr. 23, 1963

3,086,544
CHECK VALVE
Frederick R. Yost, Dayton, Ohio, assignor to General Motors Corporation, Detroit, Mich., a corporation of Delaware
Filed Oct. 12, 1960, Ser. No. 62,188
3 Claims. (Cl. 137—315)

This invention relates to a check valve and more particularly to a vacuum check valve having a plastic housing forming a seal upon assembly.

A plastic check valve is utilized in various vacuum systems positioned between the source of vacuum and a vacuum reservoir to maintain a predetermined vacuum within the reservoir. This type of a vacuum system is employed in combination with a brake booster unit whereby a supply of vacuum is needed to operate the booster unit. The size of the reservoir determines the number of stops which the booster unit will provide in the event of engine failure.

The conventional type of a vacuum check valve is constructed of a metal housing which is assembled by providing a crimp on the housing to maintain a member in position and hold the valve assembly together. The crimping of the housing to maintain the valve assembly in its assembled position requires a certain amount of effort and thereby it would be more convenient and more economical to employ a valve which would be manually assembled and automatically provides a seal as the unit is assembled. Accordingly, this invention is intended to accomplish this purpose in providing an economical check valve which may be readily assembled and yet provide a positive seal without requiring a crimping of the housing to maintain its assembled position.

It is an object of this invention to construct a vacuum check valve with a plastic housing.

It is another object of this invention to provide a valve means having a resilient housing to permit assembling and locking of a valve means due to the resilience of the housing in assembling of the valve means.

It is a further object of this invention to construct a valve of a resilient housing which permits deformation of the housing to permit assembling of the valve and housing means and provide a permanent seal by the deformation of one portion of the housing in its contacting surface with a second portion of the housing when the valve means is assembled.

The objects of this invention are accomplished by constructing a vacuum check valve of a plastic housing. A housing is formed by two members. The housing is formed with an outlet passage leading to and from the valve means. The valve is formed by a valve seat contacting a valve element in response to a biasing force of a spring means. The two members forming the housing are locked in an assembled position due to the resilience of the housing means. The first of said two members of the housing has a cylindrical opening for reception of the valve means. An inner peripheral groove is also formed of the first member of the housing for the reception of a second member of the housing means. The second member is inserted within the end of the groove by deforming the first member sufficiently to permit the insertion of the second member which snaps into a peripheral groove of the housing thereby providing a permanent locking of the valve assembly. The first member of the housing is deformed in its contacting surface with the second member to provide a vacuum seal when the valve assembly is assembled.

Further objects and advantages of the present invention will be apparent from the following description, reference being had to the accompanying drawings wherein a preferred embodiment of the present invention is clearly shown.

In the drawings:

FIGURE 1 is a plan view of the check valve.

FIGURE 2 is cross-section view taken on line 2—2 of FIGURE 1.

FIGURE 3 is an enlarged cross-section view as illustrated in the circle 3 of FIGURE 2.

Figure 4:
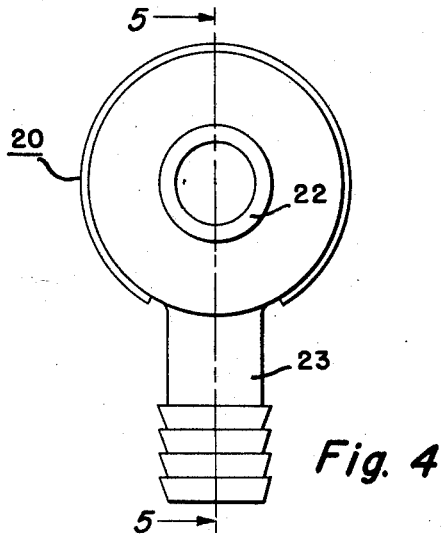
FIGURE 4 is a plan view of the check valve illustrated in FIGURE 5.

Referring to FIGURE 1, a check valve is shown in a plan view. The arrow 1 indicates the direction of the air through the check valve 2.

FIGURE 2 is a cross-section view taken on line 2—2 of FIGURE 1. The end plate 3 forms an inlet conduit 4 which is connected by conduit means to a vacuum reservoir. The end plate 3 also forms an annular ridge 5 which forms the valve seat within the valve means.

The outer periphery 6 of the end plate 3 is formed by a radius which contacts the inner periphery of the housing 7.

The housing 7 forms an outlet conduit 8 in communication with a source of vacuum. The housing 7 has a cylindrical opening for reception of the end plate 3. The outer periphery of the end plate 3 is received within the annular recess 9 formed on the inner periphery adjacent the end of housing 7. The annular recess 9 has a radial wall 10 which abuts the outer surface of the end plate 3. The inner surface of the end plate 3 abuts a sealing ridge 11. The end plate 3 deforms the sealing ridge 11 by a limited degree which causes a sealing between the end plate 3 and the sealing ridge 11 of housing 7.

The inner portion of the valve housing 7 receives the valve element 12 which includes the washer 13 and the rubber element 14. The valve member 12 is biased to a contacting position against the valve seat 5 by the spring 15. The spring 15 is maintained in a central position by a raised portion 17 of the valve housing 7.

An enlarged fragmentary cross section is shown in FIGURE 3 wherein the end plate 3 is received within the annular recess 9 of the valve housing 7. As the end plate 3 snaps into the annular recess 9, the sealing ridge 11 is deformed slightly to provide a positive seal. The axial compression and slight deformity of the sealing ridge 11 is caused by the end plate 3 forcing itself into the annular recess 9 and engaging the radial wall 10. The radial wall 10 engages a sidewall portion adjacent the outer periphery 6 of the end plate 3 forcing the end plate 3 to a firm seating position on the sealing ridge 11.

The housing 7 also is formed with a cone-shaped portion 18 on the external side of the end plate 3. The cone-shaped portion 18 aids in centering of the end plate 3 as it is assembled and permits a deformation of a valve housing 7 to permit the entrance of the end plate 3 as the valve means is assembled.

Figure 6:
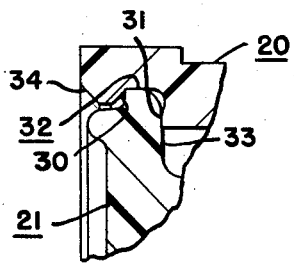
FIGURE 6 is an enlarged fragmentary cross-section view taken within the circle as indicated in FIGURE 5.
Figure 5:
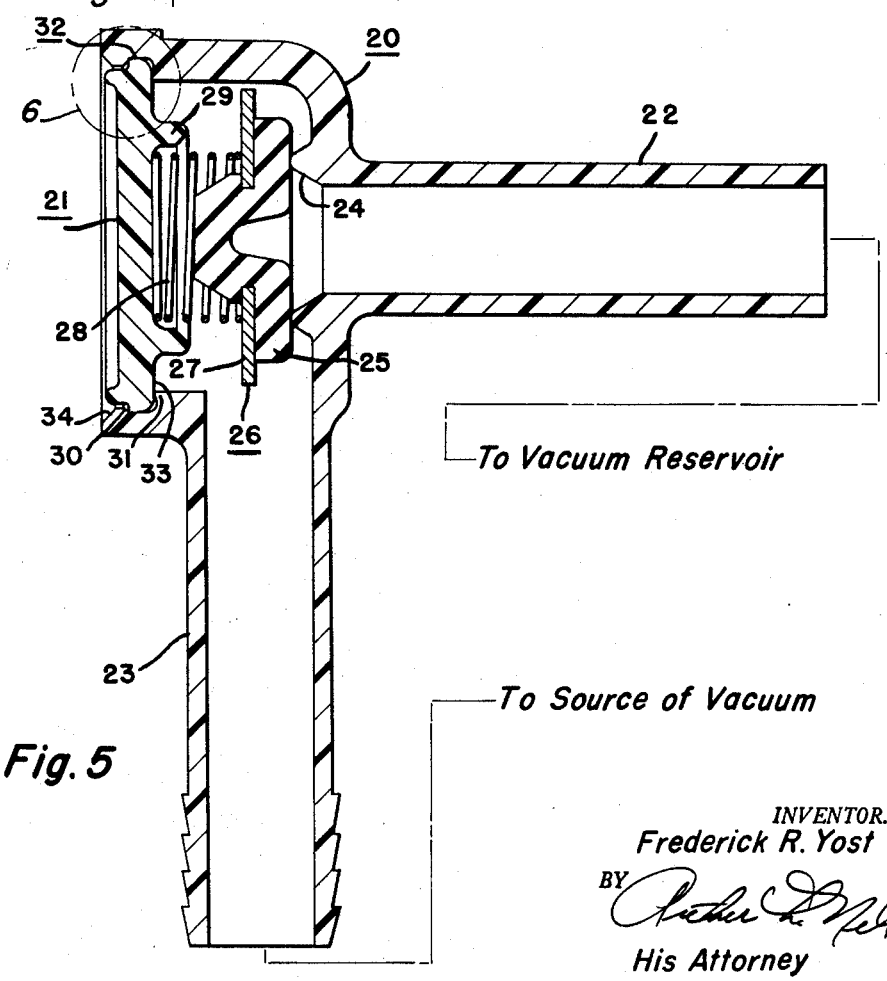
FIGURE 5 is an enlarged cross-section view taken on line 5—5 of FIGURE 4.

A modification of the check valve is illustrated in FIGURES 4, 5 and 6. FIGURE 4 illustrates a plan view of the check valve wherein the inlet and outlet conduits are formed in the housing 20. The end plate 21 is snapped into the housing 20. The inlet and outlet conduits do not create any tilting action on the end plate 21. This type of valve is more difficult to disassemble for this reason but has the added advantage of not unlocking as readily as the original version.

The conduit 22 is connected to a reservoir. The conduit 23 is connected to a source of vacuum. The housing 20 forms an annular ridge 24 forming the valve seat for the valve element 25. The valve member 26 is formed by the valve seat 25 and the washer 27. The valve member 26 is biased to a contacting position on the valve seat 24 by the spring 28. The spring 28 is centrally located within the circular raised portion 29 on the end plate 21.

An enlarged fragmentary cross-section view is illustrated in FIGURE 6. The housing 20 receives the end plate 21. The end plate 21 forms a radial wall 33 which contacts the sealing ridge 31, and deforms the sealing ridge 31 to a limited degree causing a positive sealing between the housing 20 and the end plate 21. As the end plate 21 is inserted within the annular recess 32, the conical portion 30 biases the end plate 21 to a firm seating contact on the sealing ridge 31. The conical portion 34 aids in centering of the end plate upon assembly of the end plate with the housing 20.

The valve means illustrated in FIGURES 1, 2 and 3 is assembled in the following manner. The inner end of the spring 15 is seated within the circular recess formed by the ridge 17. The valve member 12 is then placed on the spring 15 with the boss 40 extending concentrically into a portion of the spring.

The annular recess 9 formed in the housing 7 is of a narrower width than the thickness of the end plate 3. As the end plate 3 is inserted within the annular recess 9, the housing 7 deforms to receive the end plate 3. The end plate 3 snaps into the recess 9 and is firmly seated in this position by the force of the radial wall 10 axially compressing the sealing ridge 11 of the groove 9. The diametrical dimension of the end plate 3 is such that it firmly seats on the inner periphery of the groove 9. In this manner, the end plate 3 firmly seats with its end wall on the radial wall 10 of groove 9 and engages the inner periphery of the recess 9 and also deforms through axial compression the sealing ridge 11 to provide a positive seal as the valve is assembled. The radial wall is firmly locked in the annular recess 9 thereby maintaining the assembly of the valve means.

The modification illustrated in FIGURES 4, 5, and 6 is similar to the original disclosure in FIGURES 1, 2 and 3. The end plate 21, however, does not include the inlet conduit. The end plate is snapped into the end of the housing 20 by forcing the end plate against the cone-shaped portion 34 of housing 20. The housing deforms to receive the end plate which snaps into position in the annular recess 32. The inner cone-shaped surface 30 forces the end plate to axially compress the sealing ridge 31 on the housing 20. The sealing of the modified valve structure is very much the same manner as that illustrated in the original version. The advantage of this type of a valve is in the fact that no tilting stress is placed on the end plate due to the conduit which is connected to the end plate in the original version.

While the embodiment of the present invention as herein disclosed, constitutes preferred form, it is to be understood that other forms might be adopted.

What is claimed is as follows:

1. A check valve comprising in combination, a plastic valve housing, a valve chamber formed within said plastic valve housing, an end plate, a valve means for reception within said valve chamber, means for providing inlet and outlet of air through said valve chamber, an annular recess formed on the inner periphery of said valve housing, a ridge portion formed by two conical portions one of said conical portions forming a wall of said annular recess, a second wall formed on said annular recess having a sealing ridge, said end plate having a greater axial dimension than the peripheral axial dimension of said annular recess thereby axially compressing a portion of said sealing ridge when said end plate is received within said annular recess of said plastic valve housing.

2. Check valve means comprising in combination, a valve housing formed of a resilient material, a valve chamber formed in said valve housing, conduit means leading to and from said valve chamber, valve means within said valve housing, an end plate, an annular recess formed around the inner periphery of said resilient valve housing and provided with a compressible wall at one edge thereof and a radially expandable wall at the other edge thereof and having a smaller free axial dimension between the edges thereof than said end plate, said end plate having a diameter greater than the diameter of the edges of said recess for reception within said annular recess in engaging relation with the edges of said recess to first radially expand said radially expandable wall and then axially compress a portion of said compressible wall to provide a positive seal when said end plate is received within said annular recess of said valve housing.

3. A check valve comprising in combination, a plastic valve housing, a valve chamber formed within said plastic housing, valve means received within said valve chamber, conduit means leading to and from said valve chamber, an end plate having a predetermined diameter and thickness, an annular recess formed on the inner periphery of said valve housing and having an inner peripheral diameter substantially equal to the end plate diameter, a first radially expendable wall forming one wall of said recess and having a conical camming expansion surface, and a second wall forming another wall of said recess and having an axially extending and compressible sealing ridge, said sealing ridge and said first wall defining recess spaced apart a distance less than the thickness of said end plate, said end plate first engaging said conical camming surface to radially expand said first wall so that said end plate is received within said annular recess and engages said second wall and axially compresses said sealing ridge to form a positive seal when said check valve is assembled.

References Cited in the file of this patent

UNITED STATES PATENTS

| | | |
|---|---|---|
| 822,983 | Rhoda | June 12, 1906 |
| 2,223,994 | Johnson | Dec. 3, 1940 |
| 2,748,798 | Withrow | June 5, 1956 |
| 2,767,754 | Lederer et al. | Oct. 23, 1956 |